US005558189A

United States Patent [19]
Beck

[11] Patent Number: 5,558,189
[45] Date of Patent: Sep. 24, 1996

[54] ADJUSTABLE HYDRAULIC VIBRATION DAMPER

[75] Inventor: Hubert Beck, Eitorf-Keuenhof, Germany

[73] Assignee: Fichtel & Sachs AG, Eitorf, Germany

[21] Appl. No.: 507,701

[22] Filed: Jul. 26, 1995

[30] Foreign Application Priority Data

Jul. 26, 1994 [DE] Germany .......................... 44 26 385.6

[51] Int. Cl.$^6$ ............................... F16F 9/46; B60G 17/08
[52] U.S. Cl. ...................... 188/299; 188/322.13
[58] Field of Search ........................ 188/229, 315–317, 188/318, 312, 322.13, 322.15, 322.22; 280/707, 714

[56] References Cited

U.S. PATENT DOCUMENTS

| | | | |
|---|---|---|---|
| 4,880,086 | 11/1989 | Knecht et al. | 188/299 |
| 5,265,703 | 11/1993 | Ackermann | 188/299 |
| 5,398,787 | 3/1995 | Woessner et al. | 188/299 |
| 5,413,196 | 5/1995 | Förster | 188/299 |
| 5,439,085 | 8/1995 | Woessner | 188/299 |
| 5,449,055 | 9/1995 | Geiling et al. | 188/299 |

*Primary Examiner*—Robert J. Oberleitner
*Assistant Examiner*—Chris Schwartz
*Attorney, Agent, or Firm*—Nils H. Ljungman and Associates

[57] ABSTRACT

A hydraulic, adjustable vibration damper with a piston fastened to a piston rod, which piston divides a working cylinder into two working chambers filled with damping fluid, whereby at least partly to control the damping force there is a pilot-controlled, electromagnetically actuated damping valve. In this valve, a valve body and a pilot control element each apply pressure to a valve seat, and at least the valve body is mounted in a guide so that it can be displaced axially. The valve body consists of at least two parts, whereby one part is held in the axial guide and is connected to the second part so that the second part is located running in an additional axial guide, so that it can be displaced radially with respect to the first part. Whereby the valve seat of the valve body may be disposed adjacent either the first part of the valve body or the second part of the valve body.

20 Claims, 7 Drawing Sheets

PRIOR ART

FIG. 6

PRIOR ART

ADJUSTABLE HYDRAULIC VIBRATION DAMPER

BACKGROUND OF THE INVENTION

1. Field of the Invention

This invention relates to an adjustable hydraulic vibration damper with a piston fastened to a piston rod, which piston divides a working cylinder into two working chambers filled with damping fluid, whereby at least partly to control the damping force there is a pilot-controlled, electromagnetically actuated damping valve, whereby a valve body and a pilot control element each apply pressure to a valve seat, and at least the valve body is mounted in a guide so that it can be displaced axially.

2. Background Information

The prior art includes adjustable hydraulic vibration dampers (e.g. German Patent No. 37 19 113) in which the damping force is adjustable. For this purpose, a damping valve which is provided with an axially movable valve body and a valve seat controls the effective cross section of a damping passage. The electromagnetically activated damping valve thereby consists of a number of individual parts, such as the magnet armature, valve body and the armature guide which surrounds the magnet armature, whereby the individual parts have the customary manufacturing tolerances. For functional reasons, the guides for the valve body as well as the valve seats of the pilot control element and of the valve body must have corresponding tolerances, so that the valve cones guarantee the closed position, and at the same time correct axial guidance must be provided.

OBJECT OF THE INVENTION

The object of the invention is to design a valve body for a damping valve so that its correct operation is guaranteed, regardless of the manufacturing tolerances of the individual components.

SUMMARY OF THE INVENTION

The invention teaches that this object can be accomplished if the valve body is designed in at least two parts, whereby one part is held in the axial guide and is connected to the second part such that the second part is located so that it runs in an additional axial guide and can be displaced radially in relation to the first part.

The reliability of the adjustment of the damping valve is a function of the tightness of the pilot control chamber and of the corresponding valve seat. One advantage of this solution is that there is a multi-part valve body which consists of individual parts which can have rather approximate manufacturing tolerances and are therefore economical to manufacture. The multi-part valve body is also held in a sealed manner with respect to its axial guide surfaces, whereby the radial displacement of the individual parts means that the seal depends only on a single guide surface.

In an additional configuration, the valve seat of the pilot control element is located in the valve body. An additional essential characteristic of the invention is that the valve seat of the valve body is located in the first part. It is thereby advantageous that the two valve seats of the pilot control element and of the valve body each correspond to one part of the valve body, and are then located so that they can be displaced radially in relation to one another, thereby guaranteeing a correct sealing operation both with respect to their axial guide surfaces and with respect to the corresponding valve seat.

In an additional embodiment, the valve seat of the pilot control element and of the valve body are formed by the first part of the valve body.

In one embodiment, a spring applies a prestress to the first and second parts of the valve body axially toward one another. For correct operation, one part of the valve body is thereby located so that it can be displaced radially in relation to the spring, and the spring can be displaced radially in relation to at least one part of the valve body.

In an additional embodiment, the valve seat of the valve body is designed as a plane surface or as a conical surface.

To activate the pilot control chamber with the corresponding internal system pressure, the valve body has a passage which connects the front surface of the valve body to its rear side. The rear side of the valve body thereby advantageously forms one of the walls which define the pilot control chamber.

BRIEF DESCRIPTION OF THE DRAWINGS

Preferred embodiments of the invention are schematically illustrated in the accompanying drawings.

DESCRIPTION OF THE PREFERRED EMBODIMENT

Figure 1:
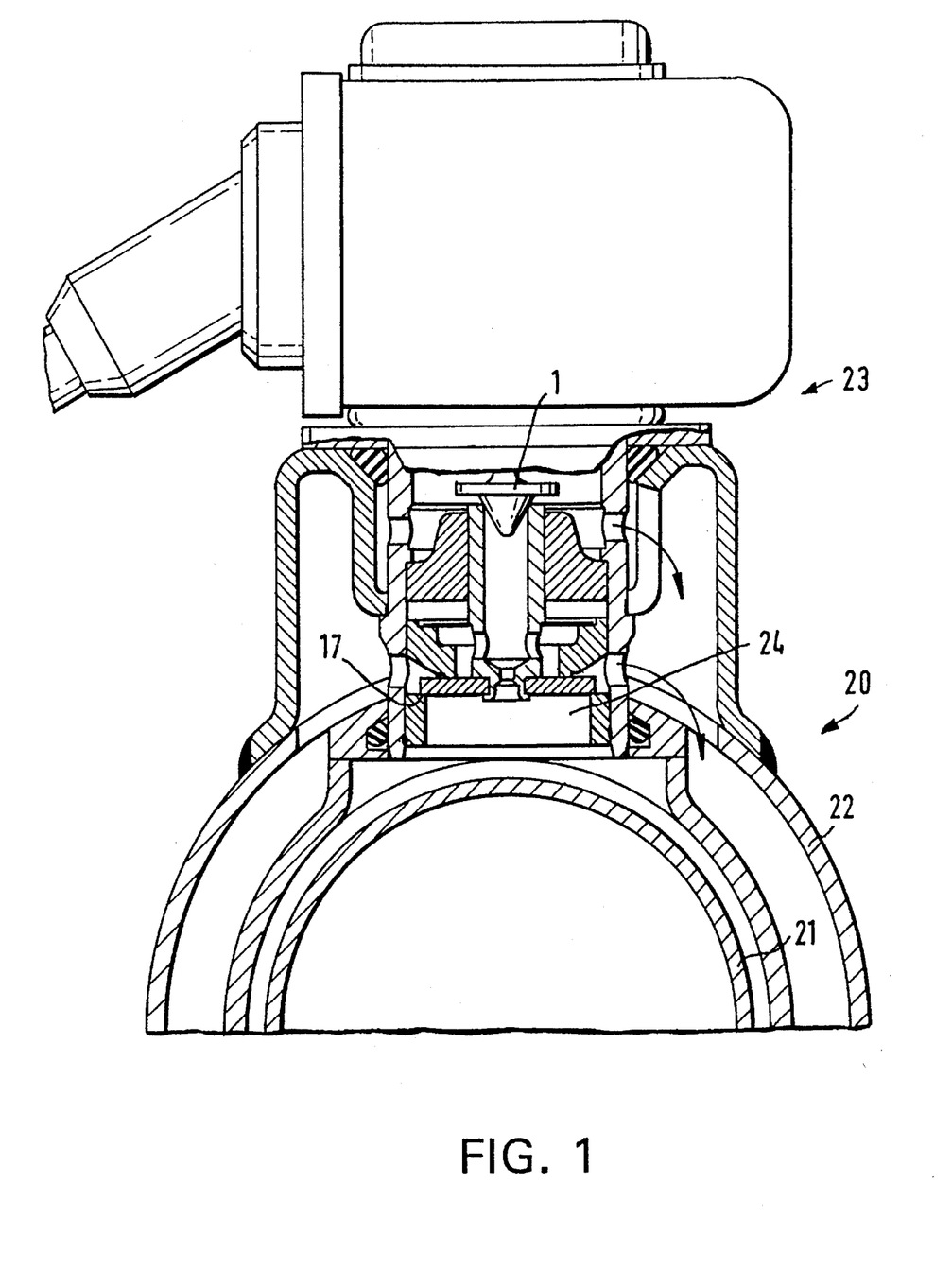
FIG. 1 shows a vibration damper together with an electromagnetically actuated damping valve, in cross section.

The embodiment illustrated in FIG. 1 shows a vibration damper 20 in cross section. For reasons of simplification, the working piston and the piston rod are not shown. The working cylinder 21 is surrounded by a jacket tube 22, on the outside circumferential surface of which there is an electrically controlled damping valve 23. The electrically controlled damping valve 23 controls the cross section of a flow passage 24 by means of the valve seat 17, thereby influencing the damping force of the vibration damper 20. The electrically controlled damping valve 23 consists individually of electrical parts which actuate a pilot control element 1. The hydraulically controlled part of the damping valve 23 is illustrated on an enlarged scale in FIG. 2.

Figure 2:
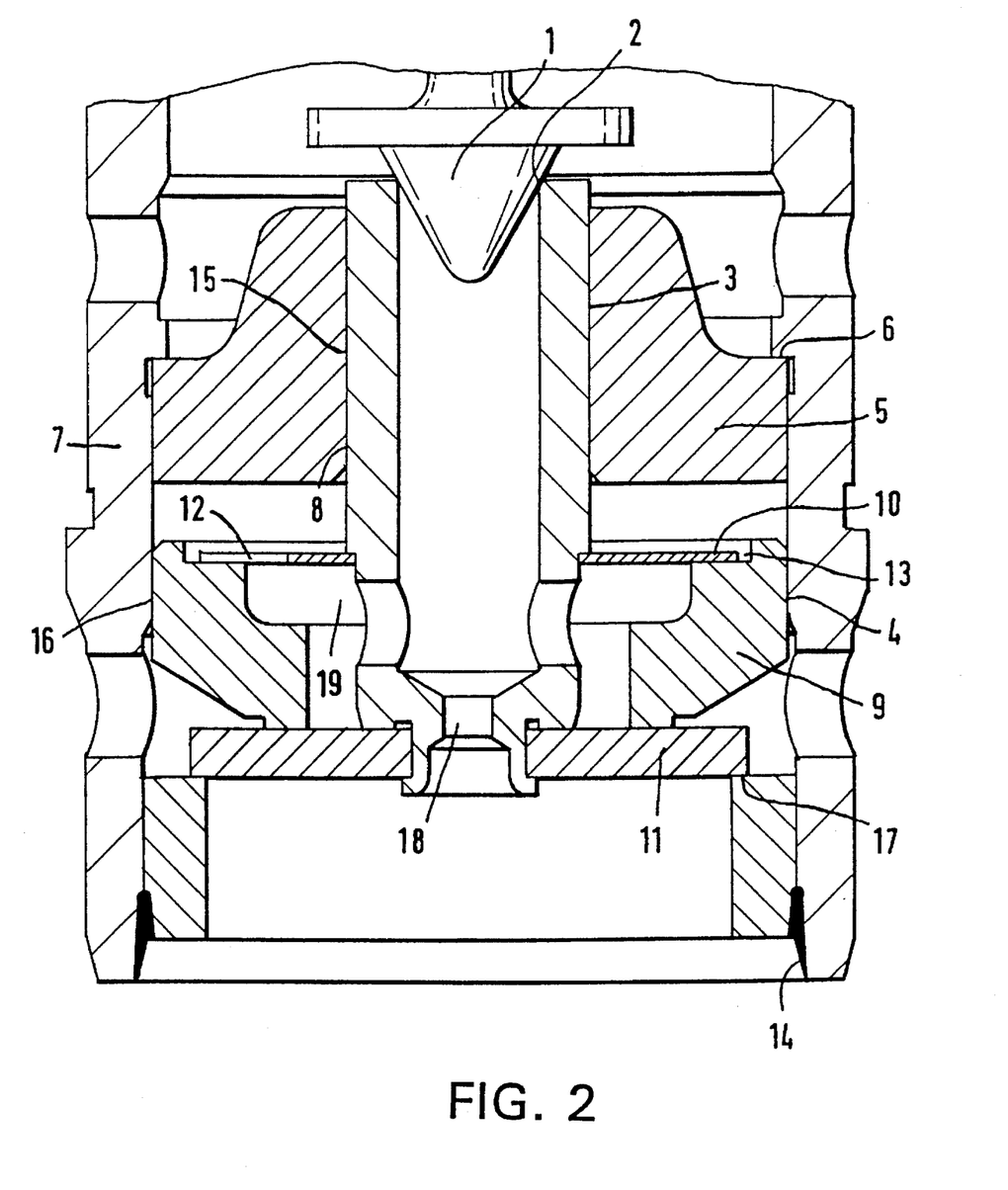
FIG. 2 is a detail of the valve body of the damping valve with its neighboring components.

FIG. 2 is an enlarged illustration of the hydraulic portion of the damping valve 23, whereby during operation of the vehicle in which the vibration damper is installed, the damping pressure applies pressure to the first part 11 of the valve body, and thereby attempts to open the valve seat 17. By means of the passage 18, a defined control pressure is built up in the pilot control chamber 19, and this control pressure attempts to move the first part 11 of the valve body in the closing direction toward the valve seat 17 of the valve body. At the same time, pressure is exerted on the pilot control element 1. The reliable control of the damping valve 23 is dependent on the tightness of the pilot control chamber 19. The tightness of the valve seats 2 and 17 is also important.

The control pressure is ultimately regulated by the pilot control element 1 and its valve seat 2. The guides 3 and 4 of the valve bodies 4 and 9 respectively are manufactured to extremely close seat tolerances, to keep the leakage from the pilot control chamber 19 into the compensating chamber of the vibration damper as low as possible. The intermediate bottom or diaphragm 5 is always pressed against a seal edge 6, and a sufficient seal is thereby created.

To produce such a damping valve 23 economically in a large series, the individual parts must be designed and fabricated with rather generous manufacturing tolerances. The intermediate bottom 5 should, if possible, be introduced into the valve housing 7 with some clearance or play, for economical reasons and to facilitate assembly. If, for example, the intermediate bottom 5 were manufactured by a process which uses a mold (e.g. of sintered material, pressure casting etc.), on one hand the radial clearance between the valve housing 7 and the intermediate bottom 5 would be cumulative, as well as the center offset of the guide hole in the intermediate bottom 5. Even rotating parts manufactured in a single chuck or clamp or fixture have small differences in coaxiality, i.e. a manufacturing tolerance. These inevitable manufacturing tolerances argue against the manufacture of a one-piece valve body (9, 11). In the extreme case, the valve body could jam.

The valve body illustrated in FIG. 2 is a multi-part assembly, i.e. it is manufactured from the first part 11 and the second part 9. Thus the second part 9 can be manufactured economically. In this embodiment, the first part 11 which acts as the valve plate is manufactured as a stamped part, and is then hardened, so that unnecessary grinding operations can be eliminated. The spring 10 has recesses 12 for a corresponding passage of the damping medium. The damping medium passage, however, can also be formed by corresponding recesses in the second part 9 of the valve body, so that the spring 10 can then be manufactured in the form of a disc.

There is a shoulder 13 to limit the radial floating of the second part 9 of the valve body, so that an excess coaxiality makes the installation of the valve body into the valve housing 7 difficult. The threading of the valve body is facilitated by an entry bevel 14. As a result of the radial mobility of the first part 11 and of the second part 9 of the valve body, the outside diameter 15 and the outside diameter 16 of the valve body can be manufactured economically, while still achieving a correct seal.

Figure 2A:
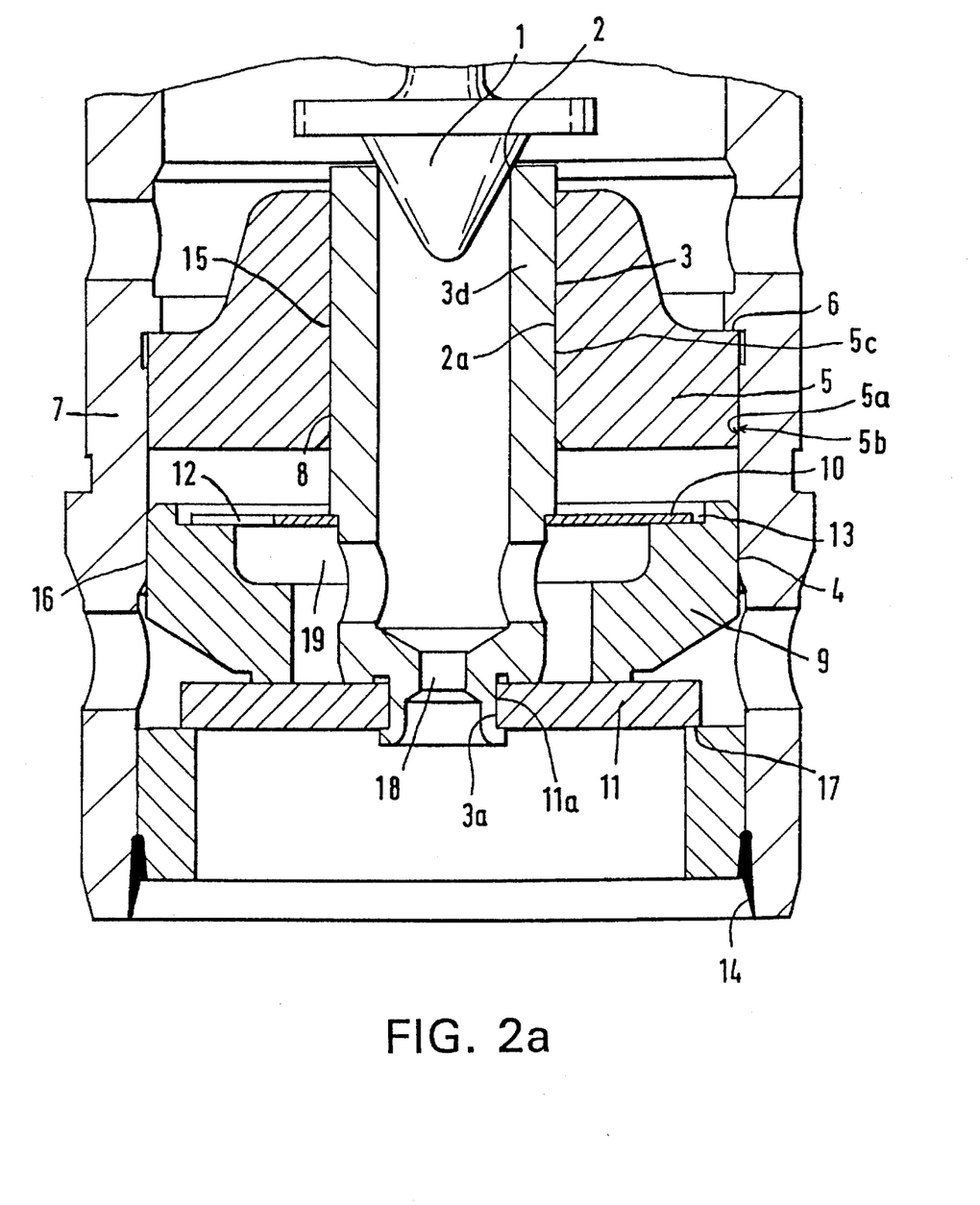
FIG. 2a is a detail of the valve body of the damping valve with its neighboring components.

FIG. 2a is a further illustration of the embodiment shown in FIG. 2. In at least one embodiment of the present invention, the intermediate bottom or diaphragm 5 may be a non-metal material, such as an elastomer, or elastic. Also illustrated in FIG. 2a are surfaces 5a on the intermediates bottom or diaphragm 5 and 5b on the valve housing 7.

Figure 3:
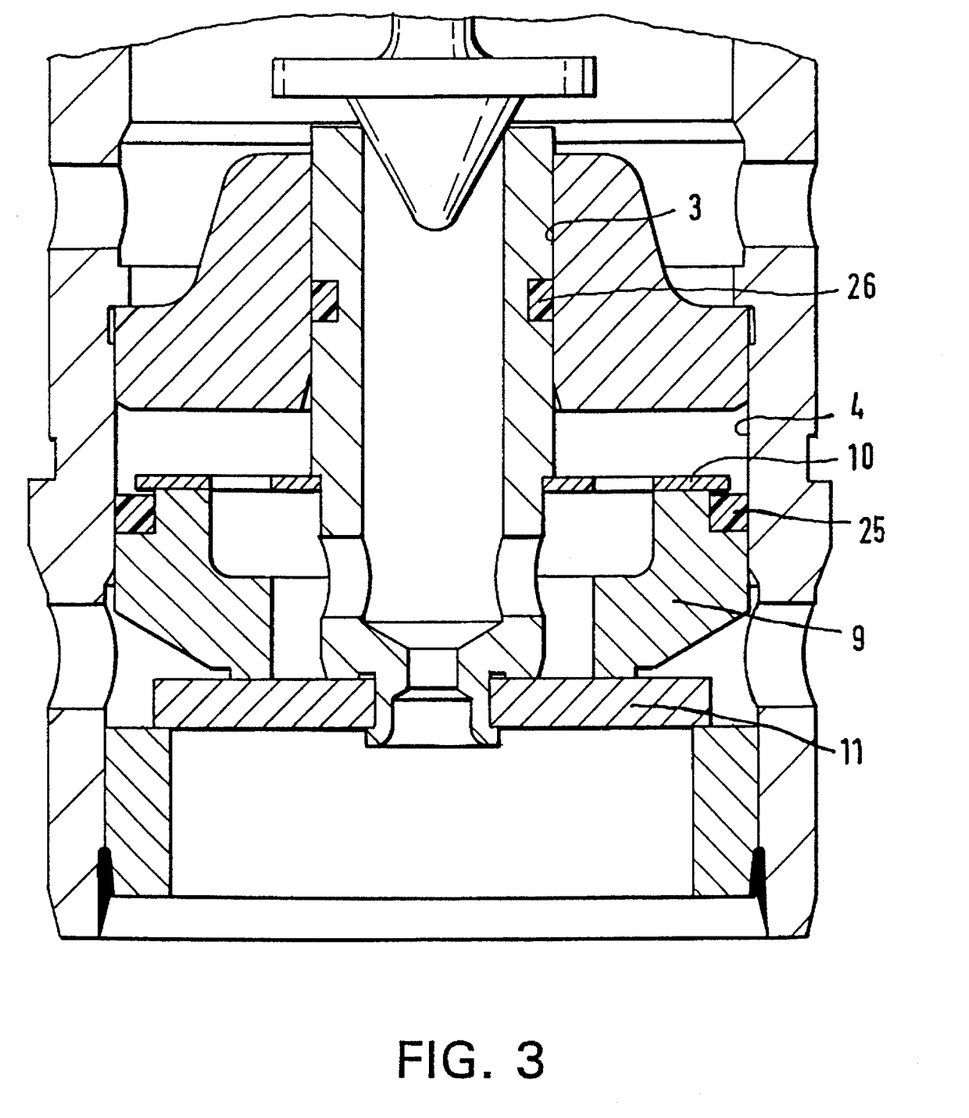
FIG. 3 shows a valve body with additional sealing measures on its guide surfaces.

FIG. 3 illustrates an embodiment in which, in the second part 9 of the valve body, there is also a seal 25 with respect to the guide 4. The first part 11 of the valve body, in the vicinity of the guide 3, also contains an additional seal 26, so that no damping medium can flow through the guides 3 and 4 of the valve body, and thus no particles of dirt can stick there. The gasket 25 is held in its location by means of the spring 10, so that the second part 9 of the valve body can be manufactured by a non-cutting process as a component without undercutting.

Figure 4:
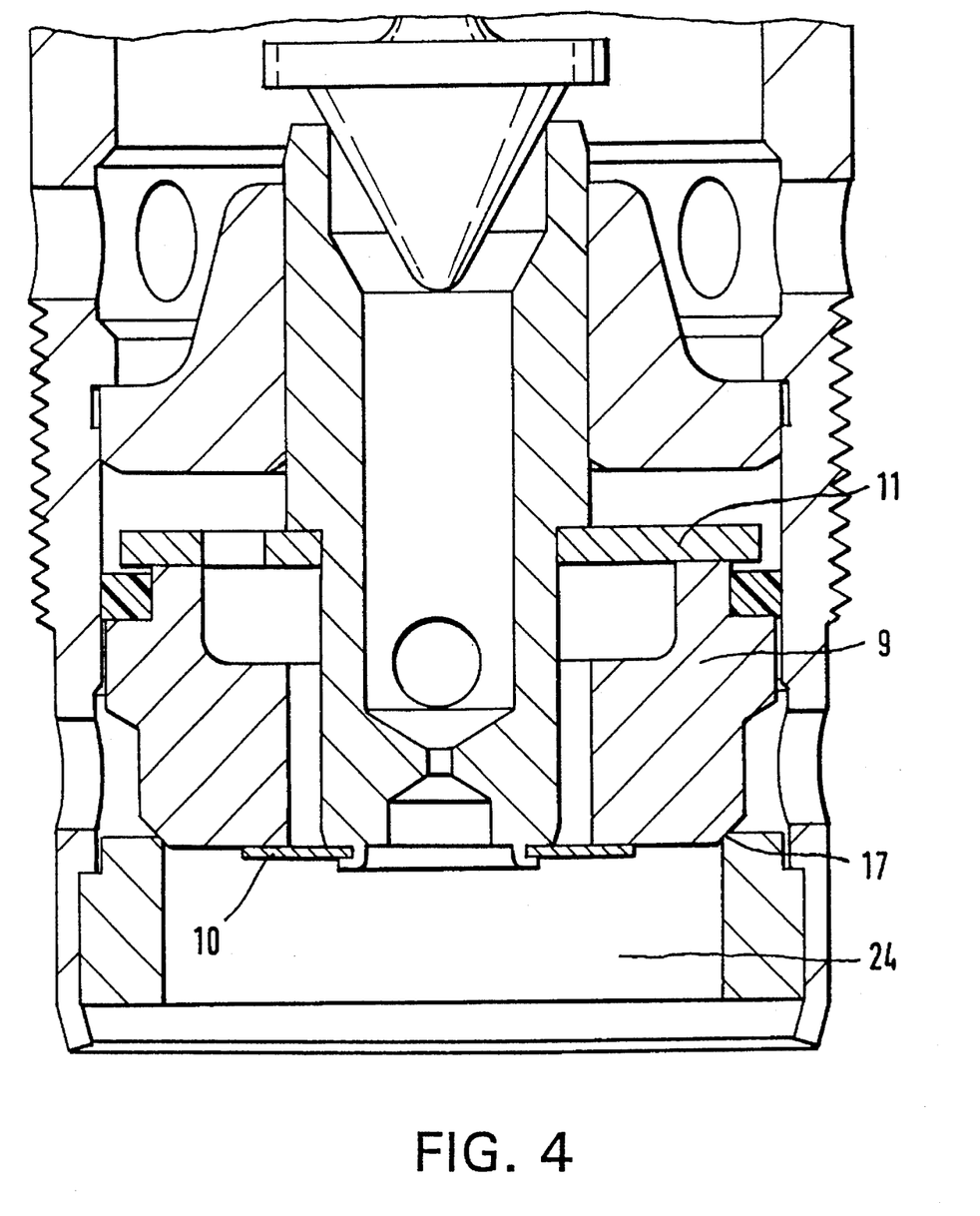
FIG. 4 shows a valve body with a conical valve seat surface.

FIG. 4 illustrates an additional embodiment of a second part 9 of the valve body, in which the valve seat 17 cooperates with a diagonally-running surface of the second part 9 of the valve body. As a result of the use of a diagonally-running seat surface, the interference force on the valve body is kept low. The interference force in question is a force which occurs in the vicinity of the flow passage 24 and, in extreme cases, can make the entire damping valve oscillate undesirably. In this embodiment, the spring 10 is located underneath the valve body, while the first part 11 of the valve body is located above the second part 9 of the valve body. Otherwise, the principle of this valve body corresponds to the principle of the valve bodies illustrated in FIGS. 2 and 3.

Figure 5:
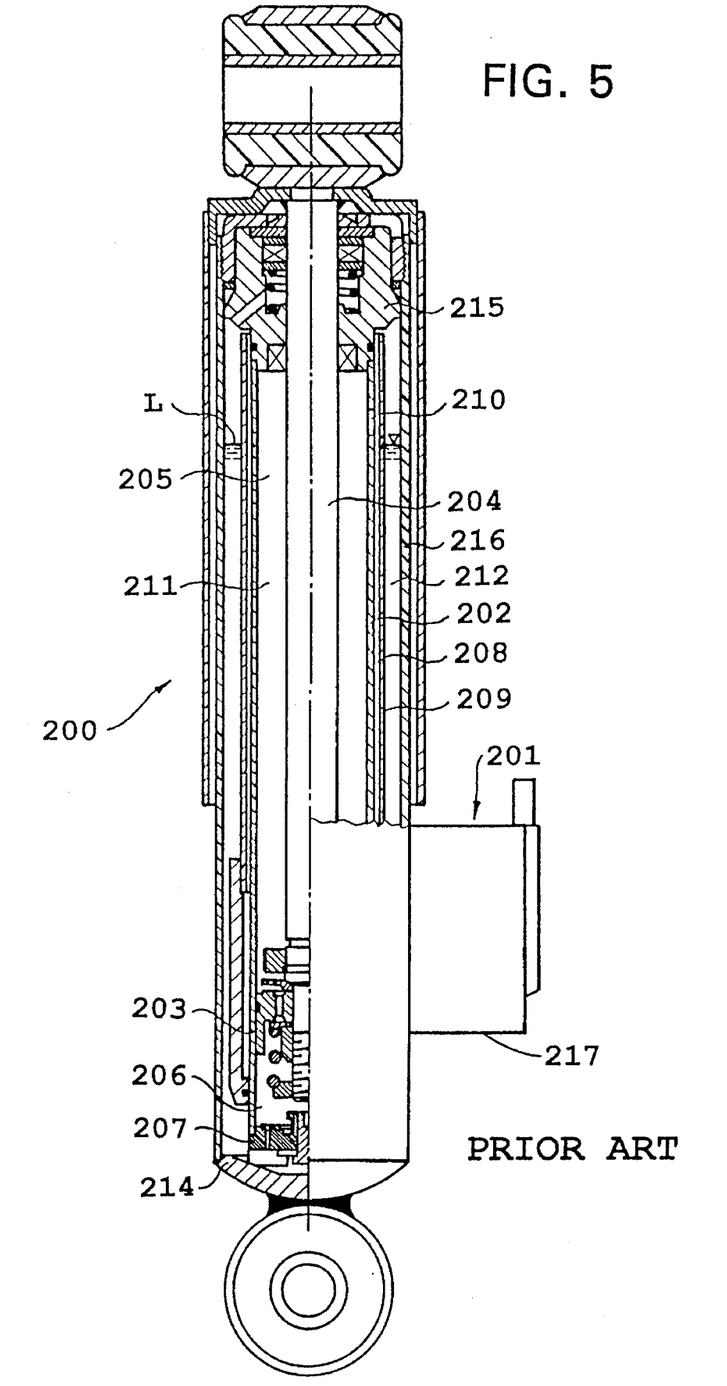
FIGS. 5 and 6 show a typical shock absorber and its components.
Figure 6:
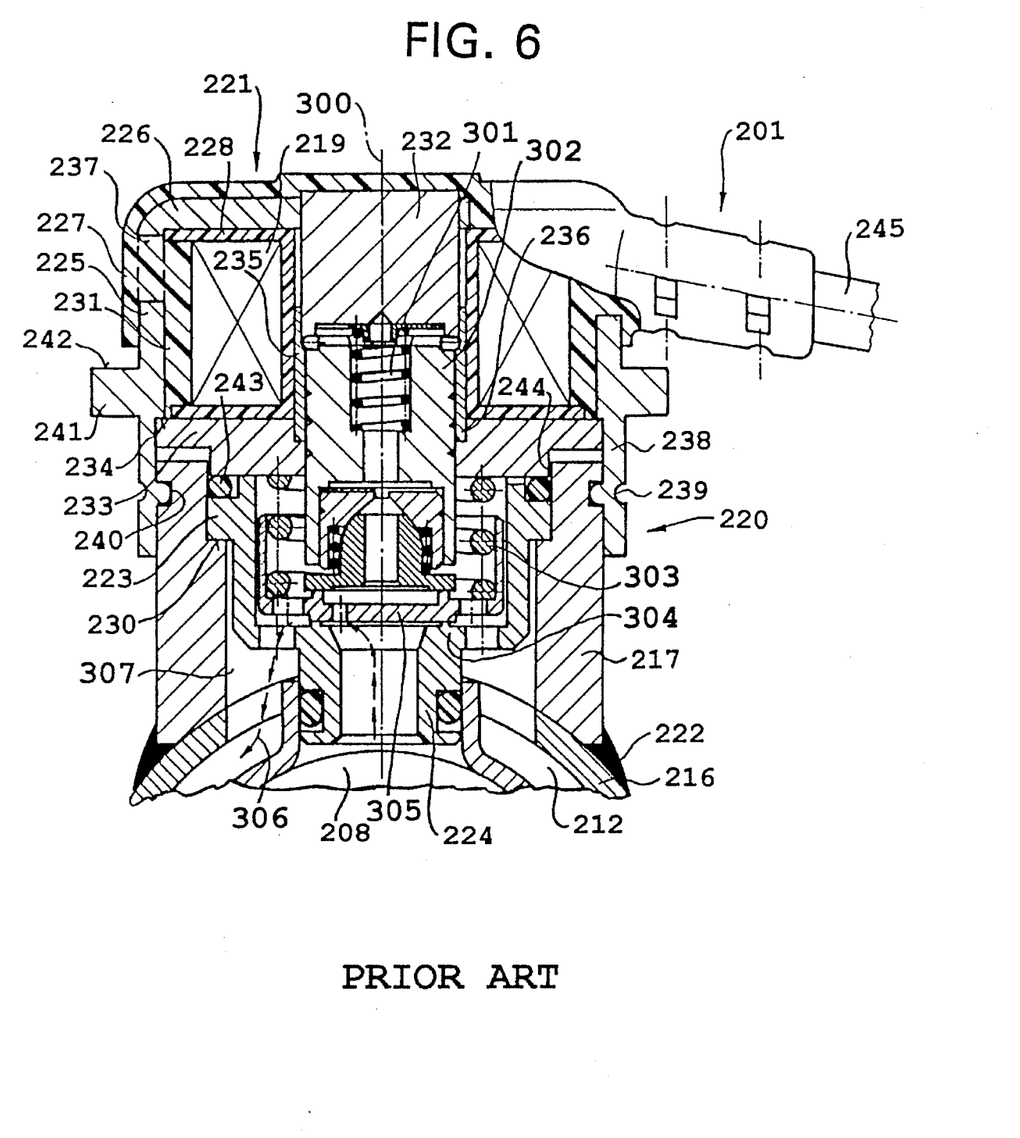

FIGS. 5 and 6 show a typical shock absorber or vibration damper in which the embodiments of the present invention may conceivably be incorporated. It should be understood that the components found hereinbelow are interchangable with the components discussed hereinabove with reference to FIGS. 1 through 4.

FIG. 5 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211,206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 6, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210,208,201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 6 one can again see the fluid path 208 and the compensating chamber 212, which are interconnectable through the valve unit 201. The fluid path 208 is connected to the upper working chamber 211 as shown in FIG. 5. The flow direction from the fluid path 208 to the compensating chamber 212 across the valve unit 201 is indicated in FIG. 6 by the dotted line 306 provided with arrows indicating the flow direction both for inward movement and outward movement of the piston rod 204 with respect to the pressure pipe 202. One can see in FIG. 6 a valve member 305 which can be lifted with respect to a valve seat 304, such as to open the flow path 306 from the fluid path 208 to the compensating chamber 212.

For explaining the principles of the embodiment of the present invention shown in FIGS. 5 and 6, it is sufficient to say that the valve member 305 is urged downward in the closing sense towards the valve seat 304 by a helical compression spring 303 and that the valve member 305 can be lifted in response to upward movement of an electromagnetic armature member 302. This armature member A is biased in downward direction by a helical compression spring 301 and can be lifted by energization of a magnetic coil 219 which is energized through a current supply cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat 304 and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis 300 and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 6 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring 303 is compressed between the iron flange portion 233 and the valve member 305, which is seated on the valve seat 304.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment 307 confined by the side tube 217 and the cover unit 221 is sealed against atmosphere. All components of the valve unit 201 are positioned with respect to each other, and the helical compression spring 303 as well as the helical compression spring 301 and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment 307 by the iron flange portion 233. The pretension during connecting the cover unit 221 and the side tube 217 is selected such that no play can occur.

One feature of the invention resides broadly in the adjustable hydraulic vibration damper with a piston fastened to a piston rod, which piston divides a working cylinder into two working chambers filled with damping fluid, whereby at least partly to control the damping force there is a pilot-controlled, electromagnetically actuated damping valve, whereby a valve body and a pilot control element each apply pressure to a valve seat, and at least the valve body is mounted in a guide so that it can be displaced axially, characterized by the fact that the valve body 9, 11 consists of at least two parts, whereby one part 11 is held in the axial guide 3 and is connected to the second part 9 so that the second part 9 is located running in an additional axial guide 4, so that it can be displaced radially with respect to the first part 11.

Another feature of the invention resides broadly in the vibration damper characterized by the fact that the valve seat 2 of the pilot control element 1 is located in the first part 11.

Yet another feature of the invention resides broadly in the vibration damper characterized by the fact that the valve seat 17 of the valve body is located on the second part 9.

Still another feature of the invention resides broadly in the vibration damper characterized by the fact that the valve seats 2, 17 of the pilot control element I and of the valve body 9, 11 are formed by and on, respectively the first part 11 of the valve body.

A further feature of the invention resides broadly in the vibration damper characterized by the fact that between the first part 11 and the second part 9 of the valve body, there is a spring 10 which applies a prestress on the two parts 9, 11 axially toward one another.

Another feature of the invention resides broadly in the vibration damper characterized by the fact that the valve seat 1/ of the valve body 9, 11 is designed as a plane surface or a conical surface.

Yet another feature of the invention resides broadly in the vibration damper characterized by the fact that the valve body 9, 11 has a passage 18 which connects the front surface with its rear side.

Still another feature of the invention resides broadly in the vibration damper characterized by the fact that the rear side of the valve body 9, 11 forms a pilot control chamber 19.

The components disclosed in the various publications, disclosed or incorporated by reference herein, may be used in the embodiments of the present invention, as well as, equivalents thereof.

Types of vibration dampers or shock absorbers having electromagnetic valves which can incorporate or be utilized in accordance with the present invention may be disclosed in the following U.S. Pat. Nos. 4,723,640 to Beck on Feb. 9, 1988, entitled "Adjustably Hydraulic Vibration Damper"; 5,265,703 to Ackermann on Nov. 30, 1993, entitled "Adjustable Hydraulic Vibration Damper for Motor Vehicles"; 5,335,757 to Knecht et al. on Aug. 9, 1994, entitled "Hydraulic Adjustable Vibration Damper"; 5,078,240 to Ackermannn et al. on Jan. 7, 1992, entitled "Valve Body in Piston Having Directional Flow Control"and 4,635,765 to Schmidt on Jan. 13, 1987, entitled "Adjustable Hydraulic Damper Apparatus."

Types of vibration dampers or shock absorbers which may incorporated the present invention may be disclosed in the following U.S. Pat. Nos. 4,993,693 to Löhr et al. on Feb. 19, 1991, entitled "Self-pumping Hydropneumatic Shock Absorbing Leg With Internal Level Regulation"; 4,986,393 to Preukschat et al. on Jan. 22, 1991; 4,749,070 to Moser et al. on Jun. 7, 1988; and 4,723,640 to Beck on Feb. 9, 1988.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

Generally, examples of components, such as electromagnetic or solenoid valves, which may be utilized in accordance with the embodiments of the present invention may be found in: U.S. patent application Ser. No. 07/971,483, having Heinz Knecht and Hubert Beck as inventors, which has been allowed for issuance as a patent; and U.S. Pat. No. 4,749,069, which issued to Knecht et al. on Jun. 7, 1988.

Additionally, examples of such components may be found in the following publications: Federal Republic of Germany Laid Open Patent Application No. 41 37 330, having Hubert Beck as inventor; and Federal Republic of Germany Patent Laid Open Patent Application No. 42 37 666, having Hubert Beck as inventor.

Methods of deep drawing, which may be utilized in accordance with the embodiments of the present invention, may be found in the following U.S. Pat. Nos. 4,532,193, which issued to Helmut on Aug. 6, 1985; No. 4,414,836, which issued to Saunders on Nov. 15, 1983; No. 4,290,293, which issued to Selines on Sept. 22, 1981; and 4,354,370, which issued to Ullman on Oct. 19, 1982.

Foreign patent publication applications, namely, Federal Republic of Germany Patent Application No. P 43 24 284.7, filed on Jul. 20, 1993, and P 43 37 018.7, filed on Oct. 29, 1993, having inventor Hubert Beck, and DE-OS P 43 24 284.7, DE-OS P 43 37 018.7, DE-PS P 43 24 284.7, and DE-PS P 43 3/ 018.7, as well as their published equivalents, if published, are hereby incorporated by reference as if set forth in their entirety herein.

The corresponding foreign patent publication applications, namely, Federal Republic of Germany Patent Application No. P 44 26 385.6-12, filed on Jul. 26, 1994, having inventor Hubert Beck, and DE-OS P 44 26 385.6-12 and DE-S P 44 26 385.6-12, as well as their published equivalents, if published are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper comprising:

a cylinder defining a chamber therein, said cylinder containing a damping fluid;

said cylinder having a longitudinal axis;

a piston rod sealingly projecting into said cylinder and being axially displaceable with respect to said cylinder;

a piston being attached to said piston rod, said piston being slidably disposed within said cylinder to sealingly divide said chamber into first and second chambers;

an outer tube disposed about said chamber, said piston and said piston rod;

means for permitting fluid communication between said first and second chambers;

said means for permitting fluid communication comprising electromagnetic damping valve means mounted at said outer tube;

said electromagnetic damping valve means comprising:
a valve arrangement, said valve arrangement having means for adjusting fluid communication between said first and second chambers;

a damping valve for adjusting the flow of the damping fluid between said first working chamber and said second working chamber;

said valve having a longitudinal axis about which said valve extends, said longitudinal axis of said valve extending essentially radially away from said longitudinal axis of said shock absorber cylinder;

said valve comprising:
a pilot valve;
said pilot valve comprising a pilot control element;
a valve body;
a valve seat;
said valve seat comprising a valving surface;
said valve body being disposed to rest against and close against said valve seat and open away from said valve seat, and thus permitting flow of said damping fluid across said valve seat;
said valving surface defining a planar area in which said valving surface is disposed;
said planar area being disposed substantially transverse to said longitudinal axis of said valve;
said valve seat being disposed to control a major flow of fluid through said valve;
said valve body comprising a first part and a second part;
said first part being movable with respect to said second part;
said first part having a first end portion and a second end portion;
said second end portion being opposite said first end portion;
said first end portion and said second end portion being disposed along said longitudinal axis of said valve;
said first end portion extending at least to said planar area defined by said valving surface;
said first end portion having a portion extending towards said valve seat;
said first end portion and said second end portion being rigidly connected to one another to prevent separation of said first end portion away from said second end portion;
said first valve body part being mounted in a first axial guide;
said second part being operatively connected to said first part such that said second part can be displaced radially within said valve with respect to the longitudinal axis of said valve;
said second part having a first extreme end and a second extreme end;
said second extreme end being opposite said first extreme end;
said first extreme end and said second extreme end being disposed along said longitudinal axis of said valve;
said first end portion of said first part extending beyond said first extreme end of said second part;
said second end portion of said first part extending beyond said second extreme end of said second part;
said second end portion of said first part being disposed adjacent said pilot control element;
said pilot control element being disposed to rest against and close against said second end portion of said first part and to open away from said second end portion of said first part, thus permitting flow of said damping fluid through said pilot valve;
said pilot control element being disposed to control a minor flow of fluid through said valve; and
said minor flow of fluid being substantially smaller than said major flow of fluid.

2. The vibration damper according to claim 1, wherein:
said first axial guide is disposed adjacent said second end portion of said first valve body part;
said first axial guide is disposed concentrically about said longitudinal axis of said valve;
said first axial guide extends a substantial distance along said longitudinal axis of said valve; and
said first axial guide is at a first radial distance from said longitudinal axis of said valve.

3. The vibration damper according to claim 2, wherein said first end portion of said first part comprises a first piece and a second piece; and
said first piece and said second piece are rigidly connected to one another.

4. The vibration damper according to claim 3, wherein:
said second axial guide is disposed between said first axial guide and said first end portion of said first valve body part;
said second axial guide is disposed concentrically about said longitudinal axis of said valve;
said second axial guide is disposed at a second radial distance from said longitudinal axis of said valve;
said second radial distance is substantially greater than said first radial distance;
said first axial guide has a first axial length defined along said first valve body part;
said second axial guide has a second axial length defined along said second valve body part;
said first axial length is substantially greater than said second axial length;
said first valve body part has a first radial width defined transverse to said longitudinal axis of said valve;
said first radial width is substantially equal to said first radial distance;
said second valve body part has a second radial width defined transverse to said longitudinal axis of said valve;

said second radial width is substantially equal to said second radial distance; and said first extreme end of said second valve body part is in contact with said portion extending toward said valve seat of said first end portion of said first valve body part.

5. The vibration damper according to claim 4, wherein said second part of said valve body is disposed so as to engage and disengage with said valve seat.

6. The vibration damper as claimed in claim 4, wherein said first part of said valve body is disposed so as to engage and disengage with said valve seat.

7. The vibration damper according to claim 6, wherein said valve further comprises:

a spring;

said spring is disposed between said first part and said second part of said valve body; and said spring being disposed to prestress said first part and said second part axially toward one another.

8. The vibration damper according to claim 7, wherein said valve seat of said valve body comprises one of:

a planar surface; and a conical surface.

9. The vibration damper according to claim 8, wherein said first end portion of said first valve body part comprises passage means for permitting the entry of damping fluid into said first valve body part.

10. The vibration damper according to claim 9, wherein:

at least a portion of said pilot control chamber is disposed in said first valve body part;

said pilot control chamber extends from said first end portion of said first valve body part to said second end portion of said first valve body part;

said pilot control chamber comprises orifices disposed in said first valve body part;

said pilot control chamber comprises sub-chambers disposed adjacent said second valve body part; and said pilot control chamber extends to said pilot control element.

11. The vibration damper according to claim 10, wherein said first piece of said first end portion of said first valve body part extends along said longitudinal axis of said valve;

said second piece of said first end portion of said first valve body part comprises said portion of said first end portion of said first part extending toward said valve seat; and said second piece comprises a circular plate;

said valve body comprises a surface area portion for engaging and disengaging with said valve seat; and said surface area portion comprises one of:

a planar surface; and a conical surface.

12. The vibration damper according to claim 11, wherein: said vibration damper further comprises:

another tube;

said another tube being disposed concentrically about said longitudinal axis of said vibration damper;

said another tube being disposed between said cylinder and said outer tube;

a compensating chamber;

said compensating chamber being substantially disposed between said cylinder and said outer tube;

said compensating chamber comprising a fluid path;

said fluid path being substantially disposed between said another tube and said cylinder; said valve further comprises:

at least a part of said first valve body part being disposed substantially concentrically about said longitudinal axis of said valve to form at least a part of said pilot control chamber;

said pilot control element being a substantially conical-shape structure;

said conical shape structure having a first part and a second part;

said first part comprises a substantially narrow end of said conical-shape structure and said second part comprises a substantially broader end of said conical-shape structure;

wherein said second end portion of said first part disposed adjacent said pilot control element comprises an additional valve seat;

said pilot control element being disposed so that said first part extends toward said first end portion of said first part and beyond said additional valve seat;

said second part of said pilot control element being in contact with said additional valve seat;

said outer tube being a first outer tube;

a second outer tube;

said second outer tube being disposed concentrically about said longitudinal axis of said valve;

said second outer tube having an exterior surface facing away from said valve body, and an interior surface facing toward said valve body;

said interior surface of said second outer tube being disposed a first radial length defined substantially transverse to said longitudinal axis of said valve;

an intermediate tube;

said intermediate tube being disposed between said second outer tube and said valve body;

said intermediate tube having a first surface facing said said valve body and a second surface facing away from said valve body;

said intermediate tube being disposed substantially concentrically about said longitudinal axis of said valve;

said first surface of said intermediate tube being disposed a second radial length defined substantially transverse to said longitudinal axis of said valve;

said first radial length being substantially greater than said second radial length;

said second radial length being substantially the same as said second radial distance;

an exterior chamber;

said exterior chamber being at least in part substantially annular in shape;

at least a portion of said intermediate tube and said second outer tube forming said exterior chamber;

a flow chamber;

said first end portion of said first valve body part forming at least a portion of said flow chamber;

an annular structure;

said annular structure being disposed adjacent said first surface of said intermediate tube;

said annular structure comprising said valve seat;

said annular structure forming a least a portion of said flow chamber;

said flow chamber having fluid communication with said fluid path;

said flow chamber having fluid communication with said passage means;

said intermediate tube comprising a first groove and a second groove;

said first groove being disposed adjacent said valve seat;

said second groove being disposed adjacent said additional valve seat;

fluid communication means for passage of fluid from said valve to said compensating chamber;

said fluid communication means comprising:
- said first groove when said pilot control element is opened away from said second valve seat;
- said second groove when said valve body is opened away from said valve seat; and
- said exterior chamber;

said valve further comprises:
- said spring being substantially transverse to said longitudinal axis of said valve;
- said spring being disposed adjacent said first valve body part and said extreme second end of said second valve body part;
- said passage means being first passage means;
- said spring comprises second passage means for passage of damping fluid;
- said second passage means comprises at least one recess in said spring;
- said intermediate tube comprises an entry bevel; and
- said entry bevel being disposed adjacent said flow path.

13. The vibration damper according to claim 5, wherein said valve further comprises:
- a spring;
- said spring is disposed between said first part and said second part of said valve body; and
- said spring is disposed to prestress said first part and said second part axially toward one another.

14. The vibration damper according to claim 13, wherein said valve seat of said valve body comprises one of:
- a planar surface; and
- a conical surface.

15. The vibration damper according to claim 14, wherein said first portion of said first valve body part comprises passage means for the entry of damping fluid into said first valve body part.

16. The vibration damper according to claim 15, wherein:
- at least a portion of said pilot control chamber is disposed in said first valve body part;
- said pilot control chamber extends from said first end portion of said first valve body part to said second end portion of said first valve body part;
- said pilot control chamber comprises orifices disposed in said first valve body part;
- said pilot control chamber comprising sub-chambers adjacent said second valve body part; and
- said pilot control chamber extends to said pilot control element.

17. The vibration damper according to claim 16, wherein said said first axial guide is disposed adjacent said second end portion of said first part of said valve body; and
- said first axial guide extends a substantial distance along said longitudinal axis.

18. The vibration damper according to claim 17, wherein said second axial guide is disposed adjacent said second part of said valve body;
- said second axial guide is disposed at a substantially greater radial distance from said longitudinal axis of said valve than said first axial guide; and
- said first axial guide is disposed at a substantially greater radial distance from said longitudinal axis of said vibration damper cylinder than said second axial guide.

19. The vibration damper according to claim 18, wherein:
- said first piece of said first end portion of said first valve body part extends along said longitudinal axis of said valve;
- said second piece of said first end portion of said first valve body part comprises said portion of said first end portion of said first part extending toward said valve seat; and
- said second piece comprises said spring;
- said first part of said valve body further comprises a circular plate;
- said circular plate has a first flat surface and a second flat surface opposite said first flat surface;
- said first flat surface of said circular plate is substantially transverse to said longitudinal axis of said valve;
- said circular plate is in contact with said first valve body part;
- said circular plate is disposed between said first axial guide and said second axial guide;
- said circular plate is in contact with said second extreme end of said second valve body part;
- said valve body comprises a surface area portion for engaging and disengaging with said valve seat; and
- said surface area portion comprises one of:
  - a planar surface; and
  - a conical surface.

20. The vibration damper according to claim 19, wherein:
said vibration damper further comprises:
- another tube;
- said another tube being disposed concentrically about said longitudinal axis of said vibration damper;
- said another tube being disposed between said cylinder and said outer tube;
- a compensating chamber;
- said compensating chamber being substantially disposed between said cylinder and said outer tube;
- said compensating chamber comprising a fluid path;
- said fluid path being substantially disposed between said another tube and said cylinder;

said valve further comprises:
- at least a part of said first valve body part being disposed substantially concentrically about said longitudinal axis of said valve;
- said pilot control element being a substantially conical-shape structure;
- said conical shape structure having a first part and a second part;
- said first part comprises a substantially narrow end of said conical-shape structure and said second part comprises a substantially broader end of said conical-shape structure;
- wherein said second end portion of said first part disposed adjacent said pilot control element comprises additional valve seat;
- said pilot control element being disposed so that said first part extends toward said first end portion of said first part and beyond said additional valve seat;
- said second part of said pilot control element being in contact with said additional valve seat;
- said outer tube being a first outer tube;

a second outer tube;

said second outer tube being disposed concentrically about said longitudinal axis of said valve;

said second outer tube having an exterior surface facing away from said valve body, and an interior surface facing toward said valve valve;

said interior surface of said second outer tube being disposed a first radial length defined substantially transverse to said longitudinal axis of said valve;

an intermediate tube;

said intermediate tube being disposed between said second outer tube and said valve body;

said intermediate tube having a first surface facing said said valve body and a second surface facing away from said valve body;

said intermediate tube being disposed substantially concentrically about said longitudinal axis of said valve;

said first surface of said intermediate tube being disposed a second radial length defined substantially transverse to said longitudinal axis of said valve;

said first radial length being substantially greater than said second radial length;

said second radial length being substantially the same as-said second radial distance;

an exterior chamber;

said exterior chamber being at least in part substantially annular in shape;

at least a portion of said intermediate tube and said second outer tube forming said exterior chamber;

a flow chamber;

said first end portion of said first valve body part forming at least a portion of said flow chamber;

an annular structure;

said annular structure being disposed adjacent said first surface of said intermediate tube;

said annular structure comprising said valve seat;

said annular structure forming a least a portion of said flow chamber;

said flow chamber having fluid communication with said fluid path;

said flow chamber having fluid communication with said passage means;

said intermediate tube comprising a first groove and a second groove;

said first groove being disposed adjacent said valve seat;

said second groove being disposed adjacent said additional valve seat;

fluid communication means for passage of fluid from said valve to said compensating chamber;

said fluid communication means comprising:
  said first groove when said pilot control element is opened away from said second valve seat;
  said second groove when said valve body is opened away from said valve seat; and
  said exterior chamber;

said valve further comprises:

said passage means being a first passage means;

said circular plate of said first part comprises second passage means for passage of said fluid;

said second passage means comprises one or more recesses in said circular plate;

valve sealing means for sealing said valve from fluid leakage;

said valve sealing means comprises a circular seal member; and said seal member being disposed between said second valve body part and said second axial guide.

* * * * *

UNITED STATES PATENT AND TRADEMARK OFFICE
CERTIFICATE OF CORRECTION

PATENT NO. : 5,558,189
DATED : September 24, 1996
INVENTOR(S) : Hubert BECK

It is certified that error appears in the above-indentified patent and that said Letters Patent is hereby corrected as shown below:

On the title page, item [56], after the '5,449,055' reference insert the following Foreign Patent Documents section:
--FOREIGN PATENT DOCUMENTS
3719113    8/1988    Fed. Rep. of Germany--.

In column 3, line 5, after 'bodies', delete "4" and insert --11--.

In column 3, line 53, after 'the', delete "intermediates" and insert --intermediate--.

In column 8, line 15, before the first occurrence of 'the', delete "incorporated" and insert --incorporate--.

In column 8, line 47, after 'Nos.', delete "4,532,193," and insert --4,532,793,--.

UNITED STATES PATENT AND TRADEMARK OFFICE
CERTIFICATE OF CORRECTION

PATENT NO. : 5,558,189
DATED : September 24, 1996
INVENTOR(S) : Hubert BECK

It is certified that error appears in the above-indentified patent and that said Letters Patent is hereby corrected as shown below:

In column 10, line 4, Claim 1, after 'guide;' insert the following new paragraph:
   --said second valve body part being mounted in a second axial guide;--.

Signed and Sealed this

Eighteenth Day of February, 1997

Attest:

BRUCE LEHMAN

*Attesting Officer*     *Commissioner of Patents and Trademarks*